United States Patent
MacDonald et al.

(10) Patent No.: US 10,914,308 B2
(45) Date of Patent: Feb. 9, 2021

(54) CROSSFLOW BLOWER APPARATUS AND SYSTEM

(75) Inventors: Mark MacDonald, Beaverton, OR (US); Jessica Gullbrand, Forest Grove, OR (US); Michael Izenson, Hanover, NH (US); Walter Swift, Lyme, NH (US); Eric Baugh, San Jose, CA (US)

(73) Assignee: INTEL CORPORATION, Santa Clara, CA (US)

( * ) Notice: Subject to any disclaimer, the term of this patent is extended or adjusted under 35 U.S.C. 154(b) by 672 days.

(21) Appl. No.: 12/495,374

(22) Filed: Jun. 30, 2009

(65) Prior Publication Data

US 2010/0172095 A1    Jul. 8, 2010

(51) Int. Cl.

| | |
|---|---|
| F04D 17/00 | (2006.01) |
| F04D 25/08 | (2006.01) |
| F04D 29/66 | (2006.01) |
| H05K 7/20 | (2006.01) |
| F04D 17/04 | (2006.01) |
| F04D 29/42 | (2006.01) |
| G06F 1/20 | (2006.01) |
| F04D 17/16 | (2006.01) |

(Continued)

(52) U.S. Cl.
CPC ............ *F04D 17/04* (2013.01); *F04D 17/164* (2013.01); *F04D 25/0613* (2013.01); *F04D 25/166* (2013.01); *F04D 29/4226* (2013.01); *G06F 1/203* (2013.01)

(58) Field of Classification Search
CPC .................................. H05K 7/20; F04D 17/04
USPC ....................................................... 454/184
See application file for complete search history.

(56) References Cited

U.S. PATENT DOCUMENTS

| | | |
|---|---|---|
| 3,251,540 A | 5/1966 | Kinsworthy |
| 3,361,341 A | 1/1968 | Laing |
| 4,987,331 A | 1/1991 | Horng |

(Continued)

FOREIGN PATENT DOCUMENTS

| | | |
|---|---|---|
| CN | 2370196 | 3/2000 |
| CN | 101369562 A | 2/2009 |

(Continued)

OTHER PUBLICATIONS

Office Action received for Japanese Patent Application No. 2010-148440, dated May 8, 2012, 5 pages including 2 pages of English Translation.

(Continued)

*Primary Examiner* — Grant Moubry
*Assistant Examiner* — Phillip Decker
(74) *Attorney, Agent, or Firm* — Kacvinsky Daisak Bluni PLLC (57) ABSTRACT

Some embodiments of an apparatus and system are described for a crossflow blower. An apparatus may comprise an enclosure having a first side and a second side where a portion of the first side is recessed in a direction of the second side. The enclosure may also comprise a first internal height between the first side and the second side and a second internal height between the recessed portion of the first side and the second side. The enclosure may also comprise a motor and a crossflow blower arranged to generate a flow of air between the first side and the second side in a direction substantially perpendicular to an axis of rotation of the crossflow blower. Other embodiments are described.

23 Claims, 9 Drawing Sheets

(51) Int. Cl.
*F04D 25/16* (2006.01)
*F04D 25/06* (2006.01)

(56) References Cited

U.S. PATENT DOCUMENTS

| | | | |
|---|---|---|---|
| 5,492,458 A | 2/1996 | Horng | |
| 5,879,141 A | 3/1999 | Yokozawa et al. | |
| 5,940,269 A | 8/1999 | Ko et al. | |
| 6,000,919 A | 12/1999 | Hsieh | |
| 6,104,607 A * | 8/2000 | Behl | 361/679.49 |
| 6,111,748 A * | 8/2000 | Bhatia | 361/695 |
| 6,170,563 B1 | 1/2001 | Hsieh | |
| 6,181,553 B1 * | 1/2001 | Cipolla et al. | 361/679.54 |
| 6,194,798 B1 | 2/2001 | Lopatinsky | |
| 6,227,286 B1 * | 5/2001 | Katsui | F28D 15/0266 165/104.33 |
| 6,232,696 B1 | 5/2001 | Kim et al. | |
| 6,241,007 B1 * | 6/2001 | Kitahara | G06F 1/203 165/185 |
| 6,252,938 B1 | 6/2001 | Tang | |
| 6,270,325 B1 | 8/2001 | Hsieh | |
| 6,304,446 B1 | 10/2001 | Hsieh | |
| 6,309,190 B1 | 10/2001 | Chen | |
| 6,315,529 B1 | 11/2001 | Hu | |
| 6,442,025 B2 * | 8/2002 | Nakamura | G06F 1/203 165/104.33 |
| 6,496,369 B2 * | 12/2002 | Nakamura | 361/697 |
| 6,512,319 B1 | 1/2003 | Horng et al. | |
| 6,525,938 B1 | 2/2003 | Chen | |
| 6,527,522 B2 | 3/2003 | Chen | |
| 6,544,011 B2 | 4/2003 | Hsieh | |
| 6,616,422 B2 | 9/2003 | Hsieh | |
| 6,637,501 B2 | 10/2003 | Lin et al. | |
| 6,655,929 B2 | 12/2003 | Hsieh | |
| 6,681,845 B1 | 1/2004 | Yeh et al. | |
| 6,712,129 B1 | 3/2004 | Lee | |
| 6,778,390 B2 | 8/2004 | Michael | |
| 6,804,115 B2 * | 10/2004 | Lai | H05K 7/202 165/104.33 |
| 6,903,928 B2 | 6/2005 | Lopatinsky et al. | |
| 6,909,602 B2 * | 6/2005 | Dietrich et al. | 361/679.08 |
| 7,044,721 B2 | 5/2006 | Horng et al. | |
| 7,120,015 B2 * | 10/2006 | Furuya | 361/679.48 |
| 7,405,932 B2 | 7/2008 | Vinson et al. | |
| 7,434,610 B2 | 10/2008 | Hwang et al. | |
| 7,586,232 B2 | 9/2009 | Lopatinsky et al. | |
| 7,626,821 B1 * | 12/2009 | Buffington | 361/719 |
| 7,697,288 B2 * | 4/2010 | Okutsu | G06F 1/203 165/104.33 |
| 7,862,309 B2 | 1/2011 | Chen et al. | |
| 7,969,738 B2 | 6/2011 | Koo | |
| 8,702,403 B2 | 4/2014 | Horng et al. | |
| 9,081,554 B2 * | 7/2015 | MacDonald | G06F 1/203 |
| 9,249,803 B2 * | 2/2016 | Broili | F04D 17/04 |
| 2002/0018337 A1 | 2/2002 | Nakamura | |
| 2002/0090307 A1 | 7/2002 | Cheng | |
| 2003/0081382 A1 * | 5/2003 | Lin | H01L 23/427 361/697 |
| 2003/0223864 A1 | 12/2003 | Horng et al. | |
| 2003/0231468 A1 | 12/2003 | Lopatinsky et al. | |
| 2004/0001316 A1 * | 1/2004 | Kamikawa | H01L 23/427 361/700 |
| 2004/0105233 A1 | 6/2004 | Lai | |
| 2004/0114328 A1 | 6/2004 | Chiou | |
| 2004/0245866 A1 | 12/2004 | Lopatinsky et al. | |
| 2004/0256933 A1 | 12/2004 | Toyokawa et al. | |
| 2005/0002163 A1 | 1/2005 | Lopatinsky et al. | |
| 2005/0121996 A1 | 6/2005 | Lopatinsky et al. | |
| 2006/0002081 A1 * | 1/2006 | Hongo | G06F 1/203 361/691 |
| 2006/0006745 A1 | 1/2006 | Lopatinsky et al. | |
| 2006/0021735 A1 | 2/2006 | Lopatinsky et al. | |
| 2006/0056153 A1 | 3/2006 | Lopatinsky et al. | |
| 2006/0078423 A1 | 4/2006 | Zheng | |
| 2006/0078428 A1 | 4/2006 | Zheng | |
| 2006/0153676 A1 | 7/2006 | Obinelo et al. | |
| 2006/0172684 A1 | 8/2006 | Hong et al. | |
| 2006/0292020 A1 | 12/2006 | Hwang et al. | |
| 2007/0053781 A1 | 3/2007 | Davis | |
| 2007/0062513 A1 | 3/2007 | Gagas | |
| 2007/0114868 A1 | 5/2007 | Horng et al. | |
| 2007/0114869 A1 | 5/2007 | Horng et al. | |
| 2007/0146988 A1 | 6/2007 | Yamagishi et al. | |
| 2007/0177349 A1 | 8/2007 | Pokharna et al. | |
| 2007/0212219 A1 | 9/2007 | Teshima et al. | |
| 2008/0035315 A1 * | 2/2008 | Han | 165/121 |
| 2009/0135560 A1 | 5/2009 | Hill et al. | |
| 2009/0273258 A1 | 11/2009 | Aiello | |
| 2009/0324403 A1 | 12/2009 | Zheng | |
| 2010/0104455 A1 | 4/2010 | Tsai et al. | |
| 2010/0172095 A1 | 7/2010 | MacDonald et al. | |
| 2012/0002368 A1 | 1/2012 | Broili et al. | |
| 2019/0360706 A1 * | 11/2019 | Zhao | F24F 1/0025 |

FOREIGN PATENT DOCUMENTS

| | | |
|---|---|---|
| DE | 3434638 A1 | 4/1986 |
| EP | 0915258 A1 | 5/1999 |
| JP | S54-128906 | 3/1978 |
| JP | 54-128906 | 10/1979 |
| JP | S60-156875 | 10/1985 |
| JP | S61-178095 | 11/1986 |
| JP | H10-47293 | 2/1998 |
| JP | 10176698 A | 6/1998 |
| JP | 3059676 U | 3/1999 |
| JP | 2000082890 | 3/2000 |
| JP | 2000323880 A | 11/2000 |
| JP | 2006-307817 A | 11/2006 |
| JP | 2008199801 | 8/2008 |
| JP | 2009085037 A | 4/2009 |
| KR | 10-2008-0085995 A2 | 9/2008 |
| WO | 19981052397 A1 | 11/1998 |
| WO | 2012/012124 A2 | 1/2012 |

OTHER PUBLICATIONS

Office Action received for Japanese Patent Application No. 2010-148440, dated May 8, 2012, 5 pgs. including 2 pgs. English translation.

Office Action received for Korean Patent Application No. 10-2010-62768, dated Jul. 25, 2012, 6 pgs. including 3 pgs.

Office Action Received for United Kingdom Patent Application No. 1010833.0, dated Aug. 30, 2011, 2 pages.

Search Report received for United Kingdom Patent Application No. 1010833.0, dated Aug. 26, 2011, 3 pages.

Office Action Received for Korean Patent Application No. 10-2010-62768, dated Nov. 29, 2011, 19 pages including 10 pages of English Translation.

International Search Report & Written Opinion received for PCT Application No. PCT/US2011/042055, dated Feb. 9, 2012, 9 pages.

First Office Action dated Sep. 17, 2010, United Kingdom Patent Application No. 1010833.0.

Office Action received for Chinese Patent Application No. 201010274746.3, dated Oct. 23, 2012, 13 pages including 7 pages English translation.

Office Action received for Japanese Patent Application No. 2010-148440, dated Nov. 27, 2012, 4 pages including 2 pages English translation.

Office Action received for U.S. Appl. No. 12/827,144 dated Jan. 14, 2013, 22 pages.

Office Action received for Taiwan Patent Application No. 99120268, dated Mar. 15, 2013, 10 pages including 4 pages English translation.

Office Action received for Korean Patent Application No. 10-2012-7031993, dated Mar. 14, 2014, 16 pages including 8 pages English translation.

Office Action received from Japanese Patent Application No. 2013-515588, dated Dec. 24, 2013, 4 pages including 2 pages English translation.

(56) References Cited

OTHER PUBLICATIONS

Office Action received for U.S. Appl. No. 15/012,754, dated Jul. 7, 2017, 12 pages.

* cited by examiner

CROSSFLOW BLOWER APPARATUS AND SYSTEM

BACKGROUND

Modern computing systems generate heat during operation. The heat may affect certain platform components of a system, and is therefore generally required to be dissipated or removed from the system. Heat generated by the computing system may be limited or reduced using various thermal management techniques and/or heat dissipation techniques. For example, heat generated by a processor may be dissipated by creating a flow of air using a fan or blower. Further, various platform-level cooling devices may be implemented in conjunction with the fan or blower to enhance heat dissipation, such as heat pipes, heat spreaders, heat sinks, vents, phase change materials or liquid-based coolants.

Traditional blowers used in portable computing systems generate a flow of air from an inlet parallel to the axis of rotation (e.g. the axial direction) to an outlet substantially perpendicular to the axis of rotation. This may be problematic in notebook computers, for example, because these traditional fans require inlet gaps above and/or below the fan housing. Because of the size constraints of a notebook computer, the cooling capacity of traditional systems is thermally limited by the size of fan that can be accommodated inside a notebook computer enclosure while allowing sufficient space for inlet gaps above and/or below the fan housing. Furthermore, the form factor of notebook computers continues to decrease in size, resulting in less available space for cooling components. Consequently, a need exists for improved cooling techniques for notebook computers.

DETAILED DESCRIPTION

The embodiments are generally directed to techniques designed to improve cooling in notebook and ultrathin notebook computers. Various embodiments provide techniques that include a crossflow blower that creates a side-in, side-out airflow pattern within a notebook computer enclosure. The creation of a side-in, side-out airflow pattern eliminates the need to allow for inlet gaps above and/or below traditional fan housings, which in turn allows for the use of a much larger fan. For example, a fan having an increased rotor height compared to a traditional notebook cooling fan may be used in the same system if a side-in, side-out airflow pattern is utilized. The use of a larger fan allows for improved cooling capabilities, increased system performance and improved acoustics.

For example, some embodiments may include an enclosure, a motor and a crossflow blower to generate a flow of air between a first side and a second side of the enclosure in a direction substantially perpendicular to an axis of rotation of the crossflow blower. The arrangement of the motor, the crossflow blower and other described components may be varied for any particular implementation or system. Furthermore, it should be understood that reference throughout to a notebook computer may include any type or form of mobile computing device. For example, the described embodiments may include a notebook, laptop, mini laptop, ultrathin notebook, netbook, tablet PC, PDA, mobile phone, smart phone or any other computing device in which cooling in a enclosure with limited space is desired. Other embodiments are described and claimed.

Embodiments may include one or more elements. An element may comprise any structure arranged to perform certain operations. Each element may be implemented as hardware, software, or any combination thereof, as desired for a given set of design parameters or performance constraints. Although embodiments may be described with particular elements in certain arrangements by way of example, embodiments may include other combinations of elements in alternate arrangements.

It is worthy to note that any reference to "one embodiment" or "an embodiment" means that a particular feature, structure, or characteristic described in connection with the embodiment is included in at least one embodiment. The appearances of the phrases "in one embodiment" and "in an embodiment" in various places in the specification are not necessarily all referring to the same embodiment.

Figure 1:
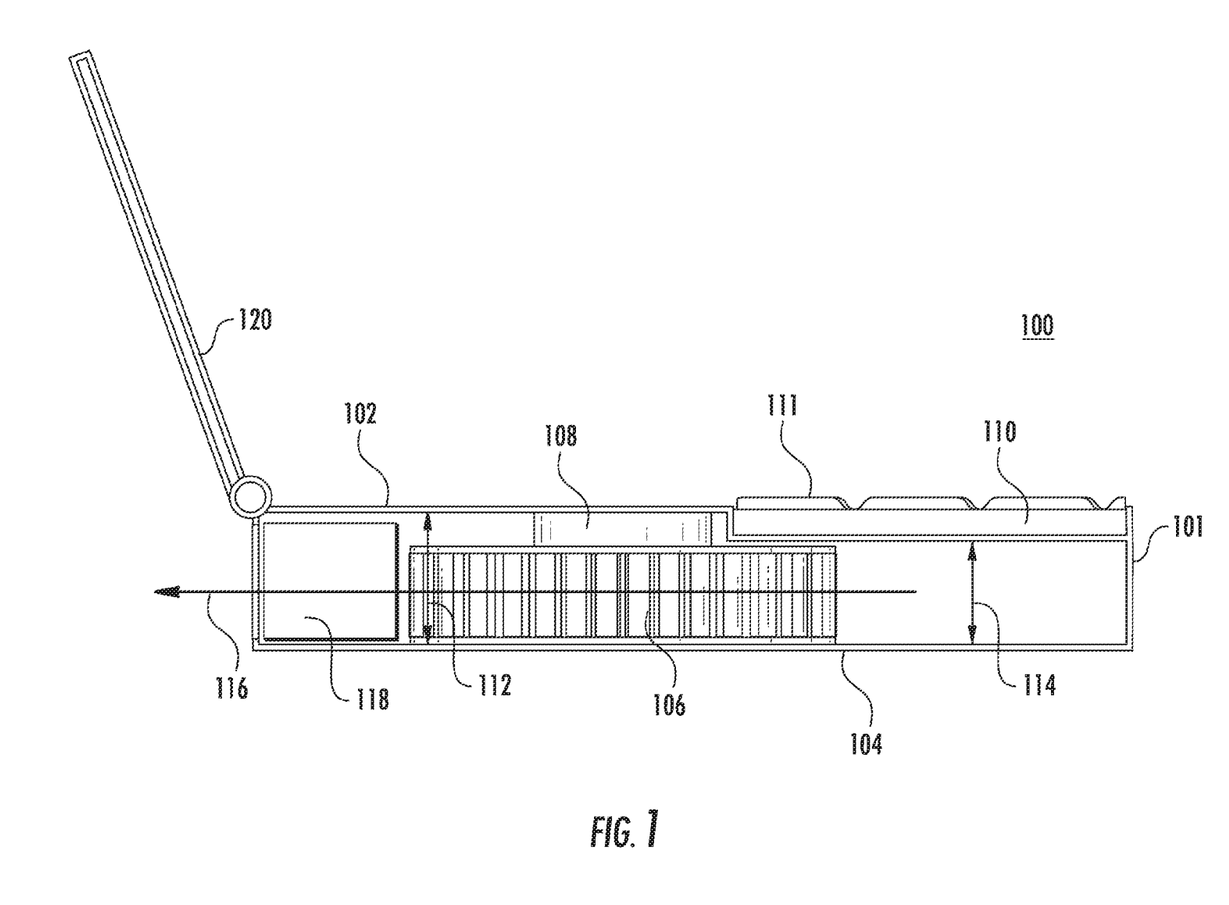
FIG. 1 illustrates one embodiment of an apparatus.

FIG. 1 illustrates one embodiment of an apparatus. FIG. 1 illustrates a block diagram of an apparatus 100. Apparatus 100 may comprise an ultrathin notebook computer having an internal enclosure height of 8.0 mm or less in some embodiments. As shown in FIG. 1, apparatus 100 comprises multiple elements, such as enclosure 101, crossflow blower 106, motor 108, keyboard 111, heat sink 118 and display 120. The embodiments, however, are not limited to the elements shown in this figure.

In various embodiments, crossflow blower 106 may comprise a fan or blower arranged to create a side-in, side-out flow of air through the blower in a direction perpendicular to the axis of rotation of the blower. Other embodiments are described and claimed.

Motor 108 may comprise any suitable electric motor capable of rotating crossflow blower 106 to create a flow of air in some embodiments. In various embodiments, motor 108 may comprise an AC motor, brushed DC motor or brushless DC motor. For example, motor 108 may comprise a DC motor powered by an internal or external power source of apparatus 100. In some embodiments, motor 108 may comprise a tip-drive motor or an ultrathin motor. The size, location within enclosure 101, and location with respect to crossflow blower 106 may be selected based on the size and performance constraints of a particular implementation.

In various embodiments, enclosure 101 may include a first side 102 and a second side 104. In some embodiments, a portion of the first side 102 may be recessed in a direction of the second side 104. The recessed portion 110 of the enclosure 101 may be configured to accommodate a keyboard assembly such as keyboard 111 such that the keys of keyboard 111 may be depressed below a top surface of the first side 102 of the enclosure 101. The enclosure may have a first internal height 112 between the first side 102 and the second side 104 and a second internal height 114 between the recessed portion 110 of the first side 102 and the second side 104. Other embodiments are described and claimed.

In some embodiments, a portion of the crossflow blower 106 may be positioned between the recessed portion 110 of the first side 102 and the second side 104. In this configuration, for example, the crossflow blower 106 may have an axial height that is approximately equal to the second internal height 114. Other heights may be used and still fall within the described embodiments. Furthermore, it should be understood that adequate space between the crossflow blower 106 and the internal surfaces of the enclosure 101 should be provided such that the crossflow blower 106 does not contact the internal surfaces of the enclosure 101 when it is operated. In various embodiments the surface features of the areas surrounding the crossflow blower 106 may be configured to minimize leakage and minimize drag on the crossflow blower 106.

The motor may be positioned above or below the crossflow blower 106, for example. In various embodiments, the motor 108 may be positioned between the crossflow blower 106 and the first side 102. In some embodiments, the motor 108 may have a height that is approximately equal to a difference between the first internal height 112 and the second internal height 114 or a difference between the first internal height 112 and the axial height of the crossflow blower. In this manner, the total internal height (e.g. height 112) may be fully utilized by the combination of crossflow blower 106 and motor 108.

In some embodiments, motor 108 may be positioned centrally above the axis of crossflow blower 106 and may control or spin the crossflow blower 106 to generate a flow of air 116. Furthermore, the motor 108 may be located between keyboard 111 and display 120, which may be coupled to enclosure 101 such that the display may be rotated with respect to the enclosure 101, in some embodiments. In various embodiments, a heat sink 118 or other heat dissipation component may be located downstream 116 from the crossflow blower 106 to assist with heat dissipation for the apparatus 100. Other embodiments are described and claimed.

Figure 2:
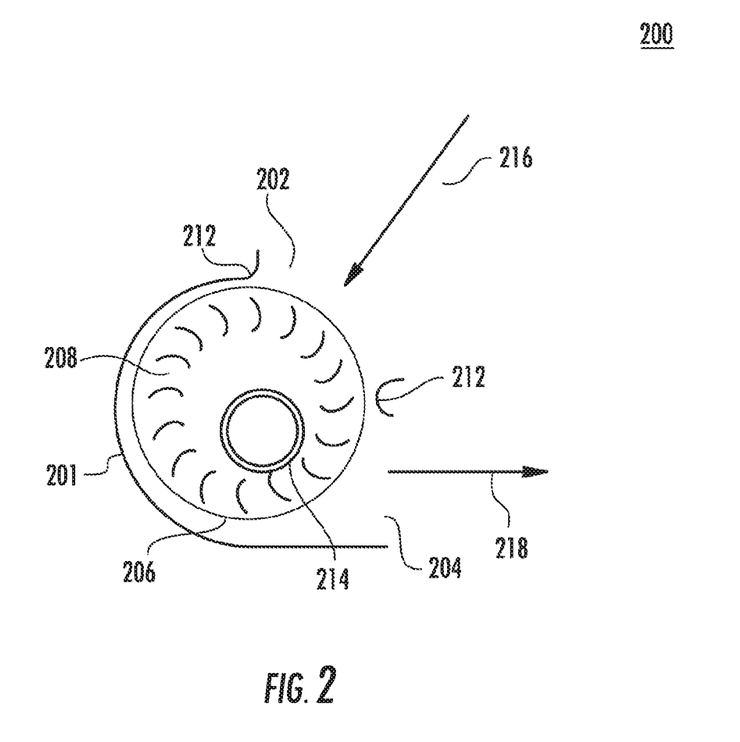
FIG. 2 illustrates one embodiment of a crossflow blower casing.

FIG. 2 illustrates an apparatus 200. Apparatus 200 may comprise a crossflow blower assembly 200 to enhance the airflow created by, for example, crossflow blower 206. Crossflow blower 206 may be the same or similar to crossflow blower 106 of FIG. 1 in some embodiments. Other embodiments are described and claimed.

Crossflow blower assembly 200 may include a crossflow blower casing 201 having an inlet 202 and an outlet 204. In some embodiments, the inlet 202 may be larger than the outlet 204, the inlet 202 and outlet 204 may be substantially the same size, or the inlet 202 may be smaller than the outlet 204. In various embodiments, the inlet 202 may include rounded corners 212 to enhance the airflow and pressure created by crossflow blower 206. The precise arrangement of the inlet 202 and outlet 204 may be selected based on the desired pressure and flow for a particular implementation of crossflow blower casing 201. Other embodiments are described and claimed.

In various embodiments, crossflow blower 206 may include an impeller 208 with a plurality of blades. Impeller 208 may comprise a rotor configured to increase the pressure and/or flow of air in some embodiments. The blades of the impeller 208 may be any size, shape, number or configuration suitable for inducing the flow of air. In some embodiments, the plurality of blades of impeller 208 may be spaced unevenly to improve the acoustic characteristics of crossflow blower 206. In various embodiments, the number of blades may be selected to reduce resonant acoustic noise created by the crossflow blower 206 in a predefined frequency range or feathering or notching of the blades of the impeller 208 may be utilized to reduce coherent noise production. Furthermore, passive or active noise cancellation components may optionally be included along with a crossflow blower system to reduce resonant noise generated by the impeller 208 in some embodiments. Other embodiments are described and claimed.

Figure 5A:
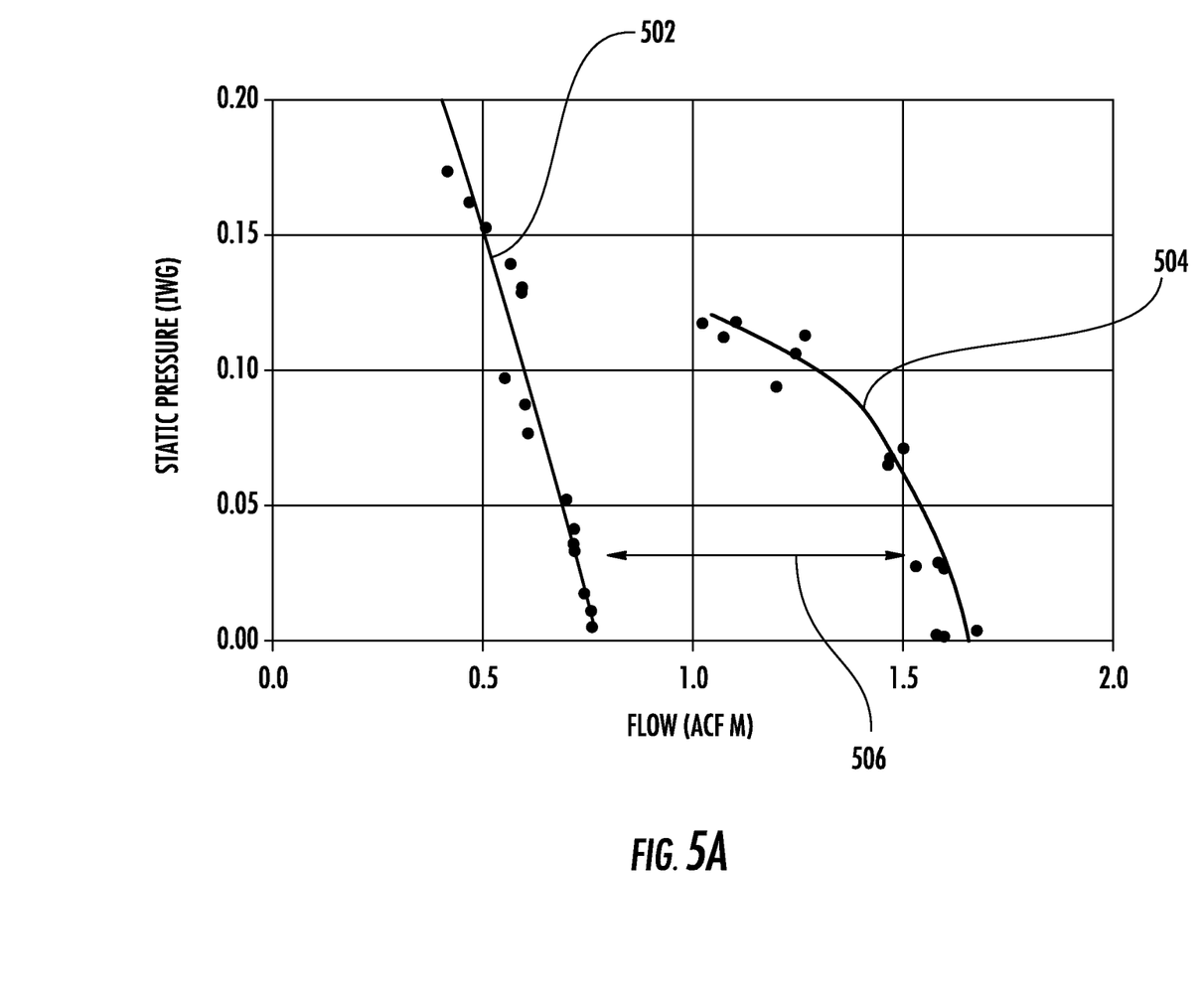
FIG. 5A illustrates one embodiment of a graph.
Figure 5B:
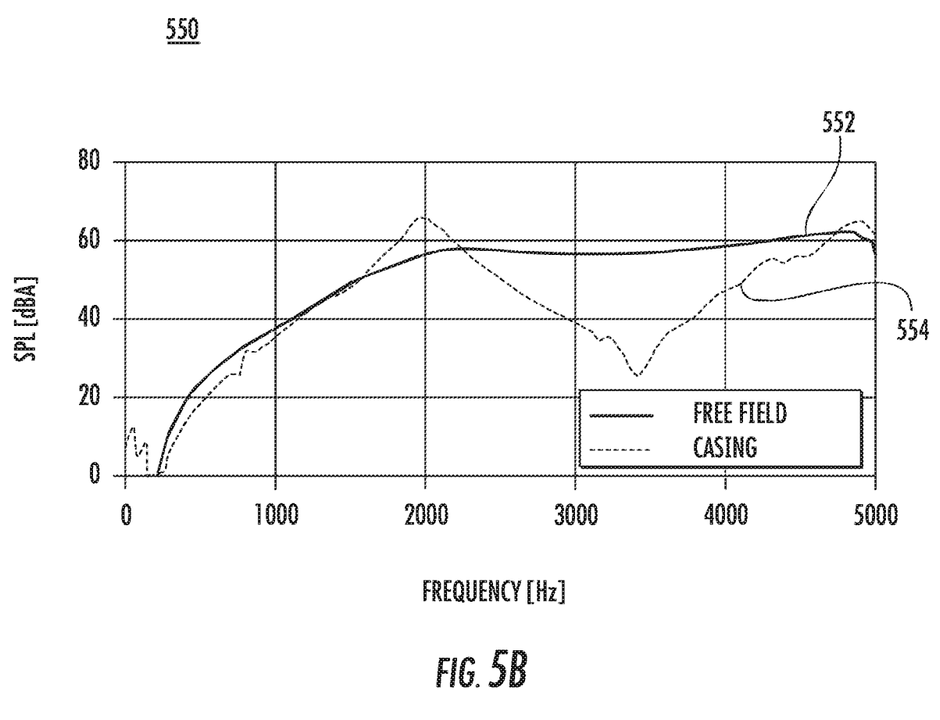
FIG. 5B illustrates one embodiment of a graph.

Crossflow blower 206, impeller 208 and crossflow blower casing 201 may be optimized for certain desired acoustic performance in some embodiments. FIG. 5B, for example, shows a graph 550 charting sound pressure level for a monopole noise source as a function of frequency outside of crossflow blower casing 201 in a free field environment (e.g. line 552 of the graph 550) and inside the crossflow blower casing 201 (e.g. line 554 of graph 550). As illustrated in FIG. 5B, crossflow blower casing 201 may alter the acoustic response of crossflow blower 206. The altered acoustic response may result in undesired performance characteristic such as excessive blower noise. In various embodiments, crossflow blower 206 and impeller 208 may be acoustically optimized to reduce the undesired acoustic performance characteristics.

Figure 5C:
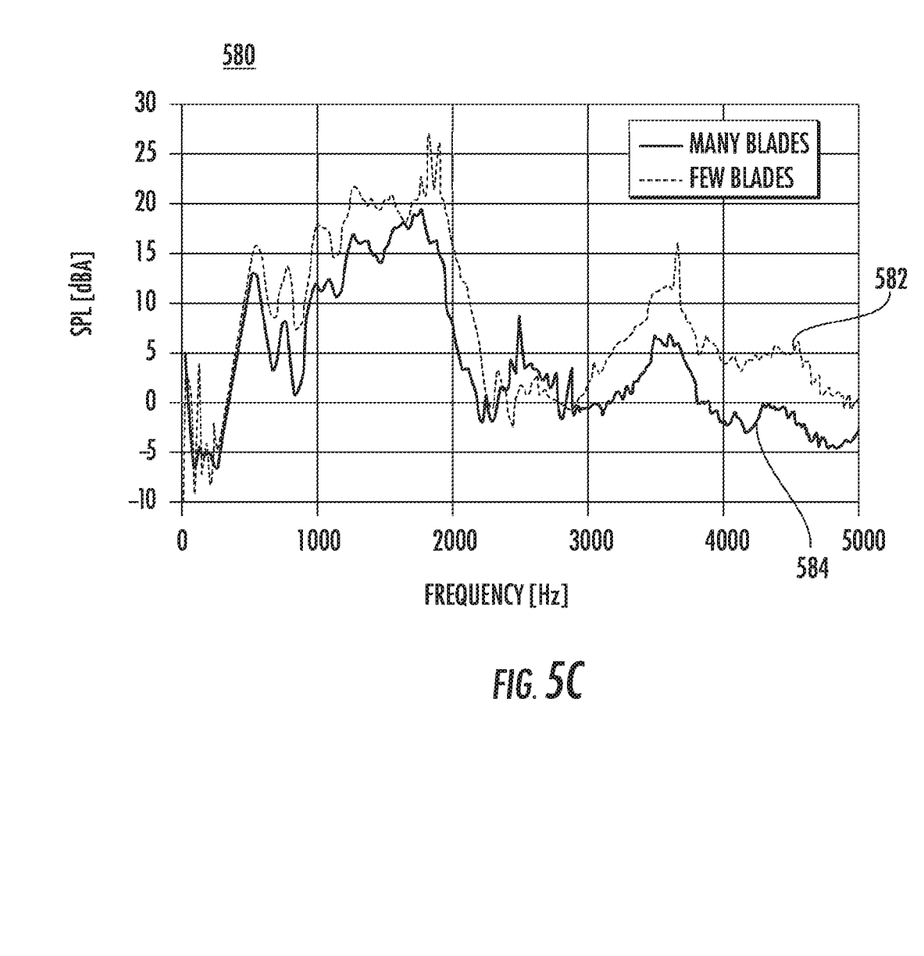
FIG. 5C illustrates one embodiment of a graph.

In some embodiments, the number of blades on impeller 208 may be selected to achieve desired acoustic performance. FIG. 5C, for example, shows a graph 580 charting sound pressure level as a function of frequency showing the location of the blade-pass-frequency for an impeller 208 having few blades (e.g. line 582 of graph 580) and an impeller having many blades (e.g. line 584 of graph 580). As shown in graph 580, the acoustic performance of crossflow blower 206 changes when the number of blades on impeller 208 is varied. In some embodiments, there may be acoustic advantages to operating in the frequency range where the acoustic noise of the system is reduced. Other embodiments are described and claimed.

Returning again to FIG. 2, the arrows marked as 216 and 218 may represent the direction of airflow for the crossflow blower assembly through crossflow blower casing 201 in some embodiments. As illustrated, airflow 216 may enter crossflow blower casing 201 through a side inlet 202 and airflow 218 may exit crossflow blower casing 201 through a side outlet 204. The positioning of inlet 202 and outlet 204 and the direction of airflows 216 and 218 may be different than that shown in FIG. 2 and still fall within the described embodiments. Other embodiments are described and claimed.

Motor 214 may also be within crossflow blower casing 201 in some embodiments. Motor 214 may be the same or similar to motor 108 of FIG. 1. In various embodiments, motor 214 may be positioned in a predetermined recirculation zone of the crossflow blower 206. For example, motor 214 may be placed at a position within crossflow casing 201 that has been determined to be a position where a vortex is created when air is flowing through the casing 201. By placing the motor 214 at this position, the amount that the motor interferes with the airflow may be minimized and the motor 214 may help to anchor or hold the vortex in place to increase performance of the crossflow blower assembly.

In various embodiments, the motor 214 may be positioned within a radius of the impeller 208 of the crossflow blower 206. For example, a portion or the entire radius of the motor 214 may overlap with a portion or the entire radius of the impeller 218 of crossflow blower 206. In this arrangement, the combined height of the motor 214 and the crossflow blower 206 may be approximately equal to an internal height of an enclosure for the apparatus, such as height 114 of enclosure 101 of FIG. 1. In some embodiments, the recirculation zone and placement of motor 214 may be located entirely inside the radius of rotor 208 such that motor 214 does not overlap with the blades of rotor 208 to reduce the possibility of mechanical interference between the motor 114 and the blades of rotor 208. Other embodiments are described and claimed.

Figure 3A:
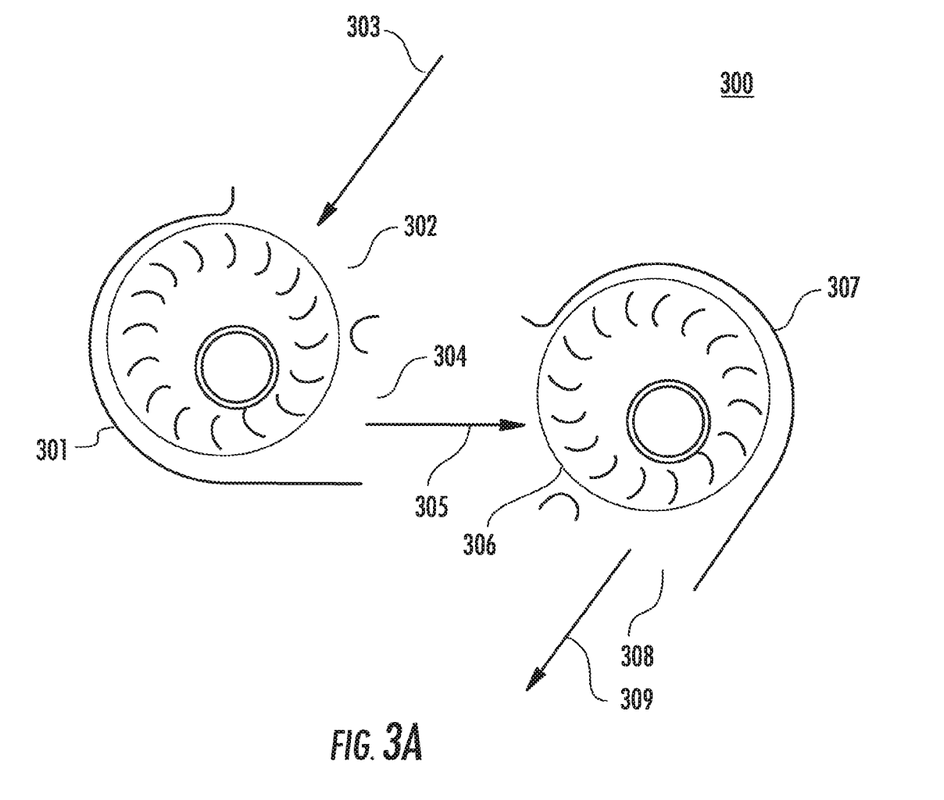
FIG. 3A illustrates one embodiment of crossflow blowers in series.
Figure 3B:
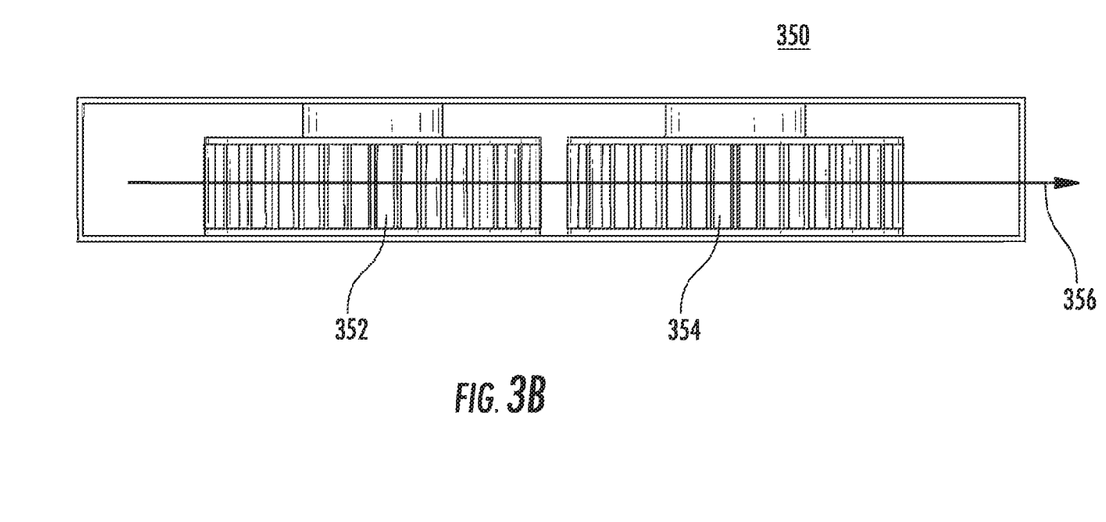
FIG. 3B illustrates one embodiment of crossflow blowers in series.

FIGS. 3A and 3B illustrate embodiments 300 and 350 including a plurality of crossflow blowers arranged in series. For example, in some embodiments, each of a plurality of crossflow blowers may be arranged to generate a flow of air in a direction substantially perpendicular to an axis of rotation of the crossflow blower and the plurality of crossflow blowers may cooperate in series.

In various embodiments, acoustic performance of a crossflow blower system may be improved by using two or more crossflow blower in series rather than a single crossflow blower operating independently. For example, crossflow blowers arranged in series may cooperate to provide the same pressure and flow performance of a single crossflow blower while operating at lower revolutions per minute (RPM) and therefore generating less acoustic disturbance. In various embodiments, similarities in inlet and outlet flow profiles of crossflow blower systems arranged in series suggest that at worst there should be no significant losses for the in-series configuration, and that at best, there may be synergistic coupling between the in-series crossflow blowers. In some embodiments, crossflow blowers arranged in series may be operated at incrementally different speeds in order to minimize blade pass frequency tones. Other embodiments are described and claimed.

FIG. 3A illustrates a crossflow blower system 300 including crossflow blowers 301 and 307 configured in series. In some embodiments, airflow 303 may enter inlet 302 of crossflow blower 301. Airflow 305 may exit outlet 304 of crossflow blower 301 and enter inlet 306 of crossflow blower 307 and airflow 309 may exit outlet 308 of crossflow blower 307. While separate airflows 303, 305 and 309 are shown for purposes of illustration, it should be understood that the airflow through crossflow blower system 300 may be contiguous in some embodiments.

As shown in FIG. 3B, for example, contiguous airflow 356 may be generated by crossflow blowers 352 and 354 arranged in series, wherein each crossflow blower 352 and 354 generates a side-in, side-out airflow. Furthermore, the particular arrangement of crossflow blowers 301, 307, 352 and 354 is shown for purposes of illustration and not limitation. While a limited number of crossflow blowers are shown for purposes of illustration, it should be understood than any number of blowers could be used in series and still fall within the described embodiments. Other embodiments are described and claimed.

Figure 4A:
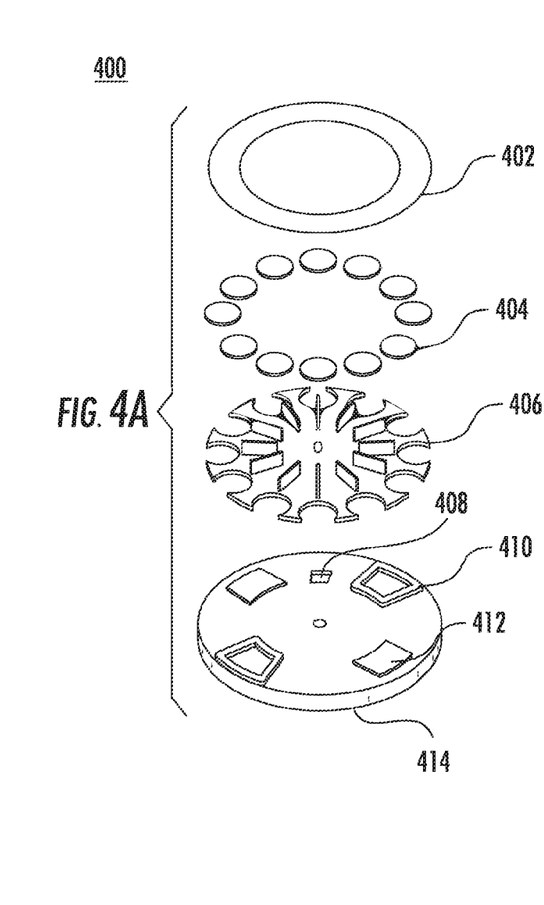
FIG. 4A illustrates one embodiment of a tip-drive motor.
Figure 4B:
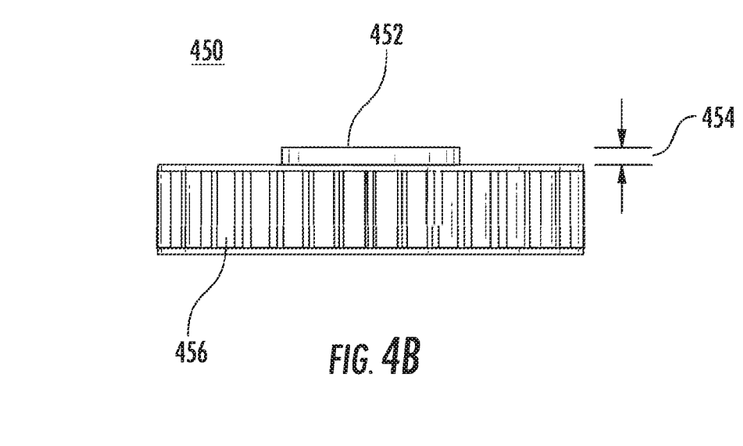
FIG. 4B illustrates one embodiment of an ultra-thin motor.

FIGS. 4A and 4B illustrate a plurality of motors that may be used for the above described embodiments in additional to or in place of traditional DC motors used in conjunction with notebook cooling fans or blowers. While a limited number of motor options are illustrated, it should be understood that any suitable motor may be used with the above described crossflow blower systems and still fall within the described embodiments. The motors illustrated in FIGS. 4A-4B may be used to replace conventional DC motors in various embodiments, and may be the same or similar to motor 108 of FIG. 1, motor 214 of FIG. 2A or motor 215 of FIG. 2B, for example.

FIG. 4A illustrates a tip-drive motor 400. Tip-drive motor 400 may comprise a magnetically tip-driven motor arranged such that the motor hub does not block or substantially does not block the primary airflow path for a crossflow blower system. In various embodiments, tip-drive motor 400 may include a magnet back iron 402. Magnet back iron 402 may comprise 1008 steel may have an approximate thickness of 0.5 mm-1.0 mm in some embodiments. Tip-drive motor 400 may also include magnet disks 404 in various embodiments. For example, the magnet disks 404 may comprise a plurality of SmCo 32H disks having approximately 10 mm diameters and having approximate thicknesses of 0.5 mm-1.0 mm.

In various embodiments, tip-drive motor 400 may also include a fan rotor/magnet retainer 406. Fan rotor/magnet retainer may include fan blades and in some embodiments may have an approximate thickness of 0.5 mm-1.0 mm. In various embodiments, base plate 414 may include stator coils 410 and iron pads 412 in some embodiments. Iron pads 412 may be arranged to assist with the alignment of magnets at startup of the motor and may comprise 1008 steel and may have an approximate thickness of 0.4 mm-1.0 mm. Stator coils 410 may comprise 100 turns of 40 AWG and may have an approximate thickness of 0.5 mm-1.0 mm and may include thermal bond insulation.

In some embodiments, the placement of magnet disks 404 at or near the outer radius of the fan rotor 406 allows for the fan rotor 406 to be spun from near its perimeter rather than from a center point as in traditional fans. In various embodiments, this configuring may allow for a more favorable positioning of the motor hub such that interference with airflow is reduced compared to central axially driving rotors. Other embodiments are described and claimed.

FIG. 4B illustrates a crossflow blower system 450 having an ultra-thin motor 452 and an impeller 456. Ultra-thin motor may comprise any DC motor having a total height (e.g. height 454) not exceeding 2.0 mm in some embodiments. Minimizing the height of ultra-thin motor 452 may allow for an increased rotor height for impeller 456 resulting in increased airflow and pressure versus use of a conventional motor having a greater height which allows for less impeller 456 rotor height.

Figure 4C:
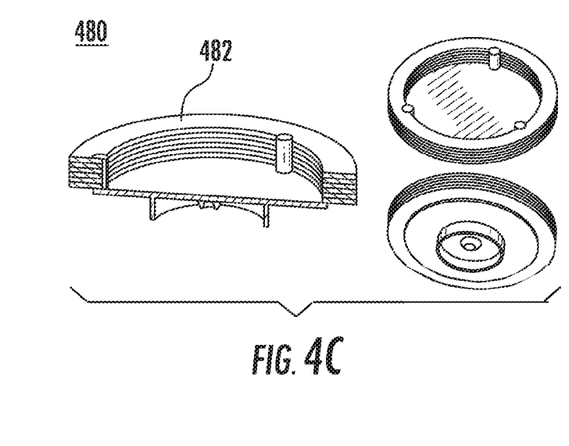
FIG. 4C illustrates one embodiment of a viscous rotor.

FIG. 4C illustrates a viscous drag based rotor 480. In various embodiments, viscous drag based rotor 480 may be configured to generate an airflow without the use of traditional blades as illustrated at 482. In some embodiments, use of a viscous drag based rotor may reduce acoustic noise compared to the noise generated by a traditional rotor having a plurality of blades. Other embodiments are described and claimed.

The above described embodiments may be used to improve airflow in ultrathin notebooks having internal heights (e.g. first internal height 112 of FIG. 1) of 8.0 mm or less. In some embodiments, an internal height of 8.0 mm may correspond to a notebook having an exterior thickness of 0.5-0.8 inches, for example. Other embodiments are described and claimed.

In various embodiments, use of any of the above described crossflow blower systems in an ultrathin notebook may result in enhanced cooling capability compared to traditional cooling methods that rely on centrifugal blowers that require inlet gaps above and/or below the blower in order to draw air through the notebook. For example, FIG. 5A illustrates static pressure versus flow at normalized acoustic noise levels for a standard blower implementation 502 and for a crossflow blower implementation 504, such as any of the above described embodiments of a crossflow blower system. As shown at 506, substantial improvements in both pressure and flow can be achieved through the use of a crossflow blower system.

Figure 6:
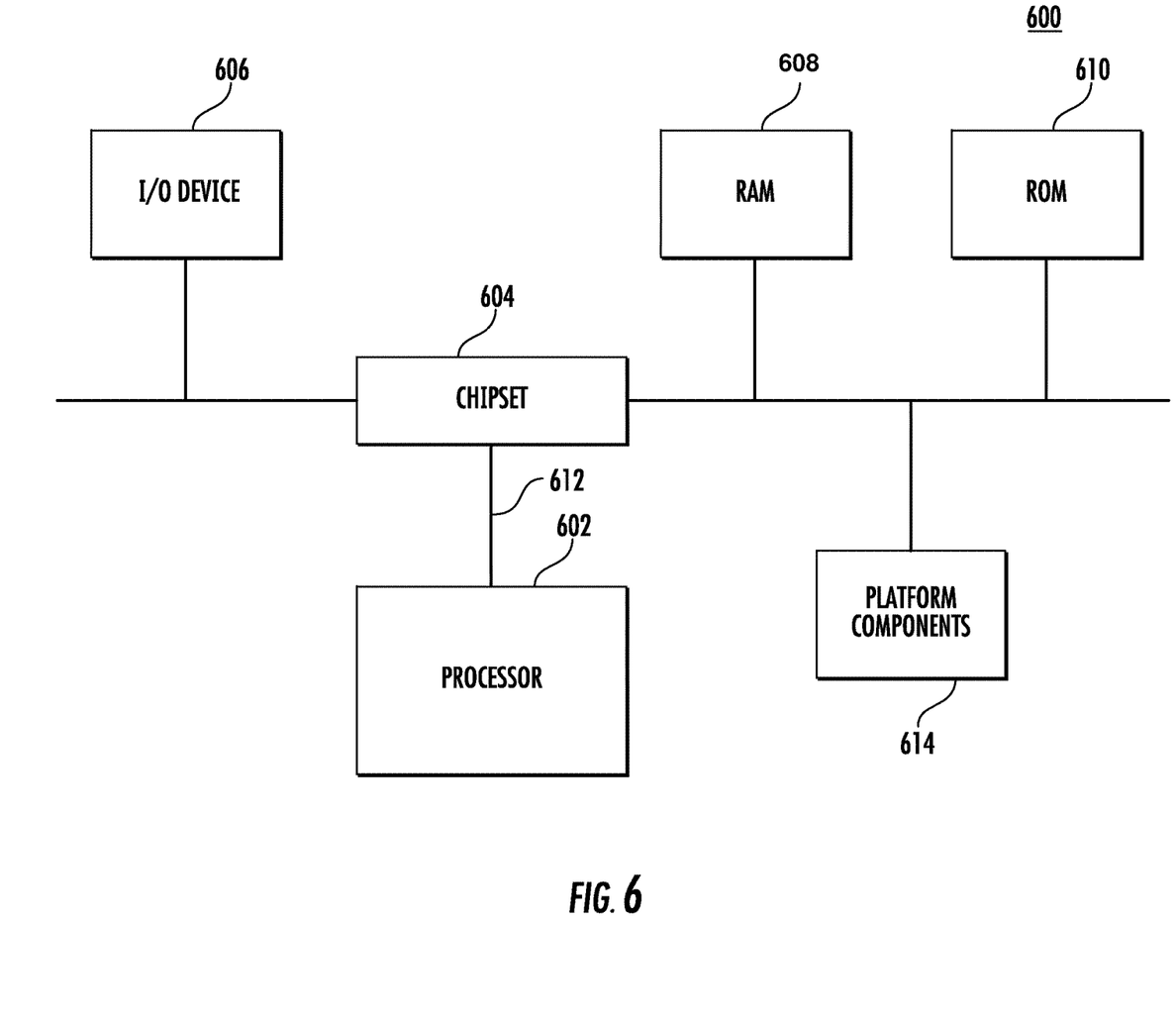
FIG. 6 illustrates one embodiment of a system.

FIG. 6 is a diagram of an exemplary system embodiment. In particular, FIG. 6 is a diagram showing a system 600, which may include various elements. For instance, FIG. 6 shows that system 600 may include a processor 602, a chipset 604, an input/output (I/O) device 606, a random access memory (RAM) (such as dynamic RAM (DRAM)) 608, and a read only memory (ROM) 610, and various platform components 614 (e.g., a fan, a crossflow blower, a heat sink, DTM system, cooling system, housing, vents, and so forth). These elements may be implemented in hardware, software, firmware, or any combination thereof. The embodiments, however, are not limited to these elements.

In particular, the platform components 614 may include a cooling system implementing various crossflow blower techniques. The cooling system may be sized for the system 600, and may include any cooling elements designed to perform heat dissipation, such as heat pipes, heat links, heat transfers, heat spreaders, vents, fans, blowers, crossflow blowers and liquid-based coolants.

As shown in FIG. 6, I/O device 606, RAM 608, and ROM 610 are coupled to processor 602 by way of chipset 604. Chipset 604 may be coupled to processor 602 by a bus 612. Accordingly, bus 612 may include multiple lines.

Processor 602 may be a central processing unit comprising one or more processor cores and may include any number of processors having any number of processor cores. The processor 602 may include any type of processing unit, such as, for example, CPU, multi-processing unit, a reduced instruction set computer (RISC), a processor that have a pipeline, a complex instruction set computer (CISC), digital signal processor (DSP), and so forth.

Although not shown, the system 600 may include various interface circuits, such as an Ethernet interface and/or a Universal Serial Bus (USB) interface, and/or the like. In some exemplary embodiments, the I/O device 606 may comprise one or more input devices connected to interface circuits for entering data and commands into the system 600. For example, the input devices may include a keyboard, mouse, touch screen, track pad, track ball, isopoint, a voice recognition system, and/or the like. Similarly, the I/O device 606 may comprise one or more output devices connected to the interface circuits for outputting information to an operator. For example, the output devices may include one or more displays, printers, speakers, and/or other output devices, if desired. For example, one of the output devices may be a display. The display may be a cathode ray tube (CRTs), liquid crystal displays (LCDs), or any other type of display.

The system 600 may also have a wired or wireless network interface to exchange data with other devices via a connection to a network. The network connection may be any type of network connection, such as an Ethernet connection, digital subscriber line (DSL), telephone line, coaxial cable, etc. The network may be any type of network, such as the Internet, a telephone network, a cable network, a wireless network, a packet-switched network, a circuit-switched network, and/or the like.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable or computer-readable medium or article which may store an instruction, a set of instructions or computer executable code that, if executed by a machine or processor, may cause the machine or processor to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter that lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
an enclosure having a first side and a second side, wherein a portion of the first side is recessed in a direction of the second side and another portion of the first side is un-recessed, the enclosure having a first internal height between the un-recessed portion of the first side and the second side and a second internal height between the recessed portion of the first side and the second side; and
a plurality of crossflow blowers arranged in series, airflow exiting at least one of the plurality of blowers entering an inlet of at least one other of the plurality of crossflow blowers, each of the plurality of crossflow blowers arranged to generate a flow of air between the first side and the second side in a direction substantially perpendicular to an axis of rotation of each of the plurality of crossflow blowers, each of the plurality of crossflow blowers comprising a motor positioned in a predetermined recirculation zone of each of the plurality of crossflow blowers, the predetermined recirculation zone positioned within a radius of an impeller of each of the plurality of crossflow blowers, a portion of at least one of the plurality of crossflow blowers positioned within the recessed portion of the first side and the second side and another portion of the at least one of the plurality of crossflow blowers positioned within the un-recessed portion of the first side and the second side, and each of the plurality of crossflow blowers has an axial height that is substantially equal to the second internal height.

2. The apparatus of claim 1, wherein the motor for at least one of the plurality of crossflow blowers is positioned between the at least one of the plurality of crossflow blowers and the un-recessed portion of the first side.

3. The apparatus of claim 2, wherein the motor has a height that is substantially equal to a difference between the first internal height and the second internal height or a difference between the first internal height and the axial height of the plurality of crossflow blowers.

4. The apparatus of claim 1, wherein the recessed portion of the first side is arranged to receive a keyboard assembly.

5. The apparatus of claim 1, at least one of the plurality of crossflow blowers having the impeller with a plurality of blades, wherein the plurality of blades are spaced unevenly, the number of blades is selected to reduce resonant noise in a predefined frequency range, or the apparatus further comprises passive or active noise cancellation to reduce resonant noise generated by the impeller.

6. The apparatus of claim 1, comprising a keyboard and a display, the motor of at least one of the plurality of crossflow blowers positioned between the keyboard and the display.

7. The apparatus of claim 1, the motor of at least one of the plurality of crossflow blowers positioned below the crossflow blower.

8. The apparatus of claim 1, the recirculation zone comprising a position of a vortex of air created by air flowing through a casing of at least one of the plurality of crossflow blowers.

9. The apparatus of claim 1, the enclosure having an inlet and an outlet, the inlet comprising a side inlet having a first opening and the outlet comprising a side outlet having a second opening, the first opening and the second opening arranged in a same plane.

10. The apparatus of claim 9, the inlet and the outlet arranged to provide a side-in, side-out airflow pattern.

11. The apparatus of claim 1, at least a portion of the plurality of crossflow blowers to operate at a different speed.

12. The apparatus of claim 1, each of the plurality of crossflow blowers comprising a casing having the inlet and an outlet for each of the plurality of crossflow blowers, the inlet larger than the outlet.

13. The apparatus of claim 12, wherein the inlet comprises rounded corners.

14. An apparatus, comprising:
an enclosure having a first side and a second side, wherein a portion of the first side is recessed in a direction of the second side and another portion of the first side is un-recessed, the enclosure having a first internal height between the un-recessed portion of the first side and the second side and a second internal height between the recessed portion of the first side and the second side;
a motor;
a crossflow blower arranged to generate a flow of air between the first side and the second side in a direction substantially perpendicular to an axis of rotation of the crossflow blower, the motor positioned in a predetermined recirculation zone of the crossflow blower, the predetermined recirculation zone positioned within a radius of an impeller of the crossflow blower, a portion of the crossflow blower positioned within the recessed portion of the first side and the second side and another portion of the crossflow blower positioned within the un-recessed portion of the first side and the second side, and the crossflow blower has an axial height that is substantially equal to the second internal height;
an additional crossflow blower disposed in series with the crossflow blower; and
a keyboard and a display, the motor positioned between the keyboard and the display or below the crossflow blower.

15. The apparatus of claim 14, the recirculation zone comprising a position of a vortex of air created by air flowing through a casing of the crossflow blower.

16. The apparatus of claim 14, a casing having an inlet and an outlet for the crossflow blower, the inlet larger than the outlet.

17. The apparatus of claim 16, the inlet comprising a side inlet having a first opening and the outlet comprising a side outlet having a second opening, the first opening and the second opening arranged in a same plane.

18. The apparatus of claim 16, the inlet and the outlet arranged to provide a side-in, side-out airflow pattern.

19. An apparatus, comprising:
an enclosure having a first side and a second side, wherein a portion of the first side is recessed in a direction of the second side and another portion of the first side is un-recessed, the enclosure having a first internal height between the un-recessed portion of the first side and the second side and a second internal height between the recessed portion of the first side and the second side;
a motor;
an additional crossflow blower disposed in series with the crossflow blower; and
a crossflow blower arranged to generate a flow of air between the first side and the second side in a direction substantially perpendicular to an axis of rotation of the crossflow blower, the motor positioned in a predetermined recirculation zone of the crossflow blower, the predetermined recirculation zone positioned within a radius of an impeller of the crossflow blower, a portion of the crossflow blower positioned within the recessed portion of the first side and the second side and another portion of the crossflow blower positioned within the un-recessed portion of the first side and the second side, and the crossflow blower has an axial height that is substantially equal to the second internal height.

20. The apparatus of claim 19, comprising a keyboard and a display, the motor positioned between the keyboard and the display.

21. The apparatus of claim 19, the motor positioned below the crossflow blower.

22. The apparatus of claim 19, the recirculation zone comprising a position of a vortex of air created by air flowing through a casing of the crossflow blower.

23. The apparatus of claim 19, a casing having an inlet and an outlet for the crossflow blower, the inlet larger than the outlet, the inlet and the outlet arranged to provide a side-in, side-out airflow pattern.

* * * * *